(12) United States Patent
Yamanaka et al.

(10) Patent No.: US 8,294,478 B2
(45) Date of Patent: Oct. 23, 2012

(54) CAPACITIVE OCCUPANT SENSOR

(75) Inventors: Shoichi Yamanaka, Anjo (JP);
Hideyuki Hayakawa, Nishio (JP)

(73) Assignee: Denso Corporation, Kariya (JP)

( * ) Notice: Subject to any disclaimer, the term of this patent is extended or adjusted under 35 U.S.C. 154(b) by 380 days.

(21) Appl. No.: 12/802,562

(22) Filed: Jun. 9, 2010

(65) Prior Publication Data
US 2010/0315101 A1   Dec. 16, 2010

(30) Foreign Application Priority Data
Jun. 12, 2009 (JP) ................................ 2009-141604

(51) Int. Cl.
*G01R 27/26* (2006.01)

(52) U.S. Cl. .......... 324/686; 324/658; 324/679; 702/47; 702/52; 257/415; 438/50; 297/217.3; 297/452.48

(58) Field of Classification Search ............... 324/658, 324/686, 679; 702/47, 52; 73/862, 337; 297/452.48, 217.3; 257/415; 438/50
See application file for complete search history.

(56) References Cited

U.S. PATENT DOCUMENTS

| | | | |
|---|---|---|---|
| 6,356,194 B1 | 3/2002 | Fukui et al. | |
| 6,609,752 B2 * | 8/2003 | Inoue | 297/217.3 |
| 6,794,590 B2 * | 9/2004 | Federspiel | 200/85 R |
| 7,637,532 B2 | 12/2009 | Yamanaka et al. | |
| 2006/0164254 A1 * | 7/2006 | Kamizono et al. | 340/667 |
| 2008/0100425 A1 | 5/2008 | Kiribayashi | |
| 2008/0198024 A1 | 8/2008 | Kamizono et al. | |

FOREIGN PATENT DOCUMENTS

| | | |
|---|---|---|
| JP | 03-136358 | 6/1991 |
| JP | 2000-038077 | 2/2000 |
| JP | 2001-267752 | 9/2001 |
| JP | 2003-212018 | 7/2003 |
| JP | 2008-064501 | 3/2008 |
| JP | 2008-111809 | 5/2008 |
| JP | 2008-203150 | 9/2008 |
| WO | WO 2008/141205 | 11/2008 |

OTHER PUBLICATIONS

U.S. Appl. No. 12/802,541, filed Jun. 9, 2010, Yamanaka et al.

* cited by examiner

*Primary Examiner* — Patrick Assouad
*Assistant Examiner* — Son Le
(74) *Attorney, Agent, or Firm* — Harness, Dickey & Pierce, PLC (57) ABSTRACT

A capacitive occupant sensor includes a sensor mat having a base member and a main electrode arranged on the base member. The main electrode has a first electrode, and a second electrode to cover the first electrode. The second electrode is cheaper than the first electrode. The base member is constructed by U-parts, and an opening of the U-part is defined to be surrounded by two extending portions and a bent portion connecting the extending portions. The first electrode is located adjacent to the opening, when the first electrode is patterned on the bent portion.

10 Claims, 11 Drawing Sheets

FIG. 12

CAPACITIVE OCCUPANT SENSOR

CROSS REFERENCE TO RELATED APPLICATION

This application is based on Japanese Patent Application No. 2009-141604 filed on Jun. 12, 2009 and Japanese Patent Application No. 2009-141186 filed on Jun. 12, 2009, the disclosures of which are incorporated herein by reference in its entirety.

BACKGROUND OF THE INVENTION

1. Field of the Invention

The present invention relates to a capacitive occupant sensor.

2. Description of Related Art

JP-A-2008-203150 discloses a capacitive occupant detecting system to detect an occupant seated on a vehicle seat. The system has a sensor portion arranged on a seat face of the vehicle seat.

The sensor portion includes a main part having a silver electrode and a carbon electrode. The silver electrode is arranged on a base film, and is further used as a wiring. The carbon electrode is arranged on the base film so as to cover the silver electrode. Material cost of the silver electrode is higher than that of the carbon electrode. A plane structure of the base film has a rectangular frame shape, and the silver electrode of the main part is formed to correspond to the plane structure of the base film.

A capacitance variation of the sensor portion is detected by the system. Thus, it is detected whether an occupant is seated on the vehicle seat.

The main part of the sensor portion is constructed by the carbon electrode and the silver electrode. The silver electrode is more expensive than the carbon electrode. If an amount of the carbon electrode is increased so as to reduce a cost of the main part, a resistance of the main part becomes large. If an amount of the silver electrode is increased so as to reduce the resistance of the main part, the cost of the main part becomes high.

SUMMARY OF THE INVENTION

In view of the foregoing and other problems, it is an object of the present invention to provide a capacitive occupant sensor.

According to an example of the present invention, a capacitive occupant sensor to, detect an occupant seated on a vehicle seat includes an electrostatic sensor mat arranged inside of the vehicle seat. The mat includes a base member and a main electrode arranged on the base member so as to detect the occupant based on a capacitance variation. The main electrode has a first electrode and a second electrode to cover the first electrode. The second electrode is cheaper than the first electrode. The base member includes a plurality of U-shaped U-parts. The U-part has two of extending portions linearly extending in a first direction, a bent portion connecting ends of the extending portions, and an opening recessed in the first direction and surrounded by the extending portions and the bent portion. The U-parts located adjacent to each other are connected with each other so as to define a S-shaped S-part, in a manner that the openings alternately open toward a first side of the first direction or a second side of the first direction. The base member is constructed by a plurality of the S-parts. The first electrode is located adjacent to the opening, when the first electrode is patterned on the bent portion.

Accordingly, a cost of the capacitive occupant sensor can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

A capacitive occupant sensor 1 of a first embodiment is arranged inside of a vehicle seat so as to detect whether an occupant is seated on the vehicle seat.

Figure 1:
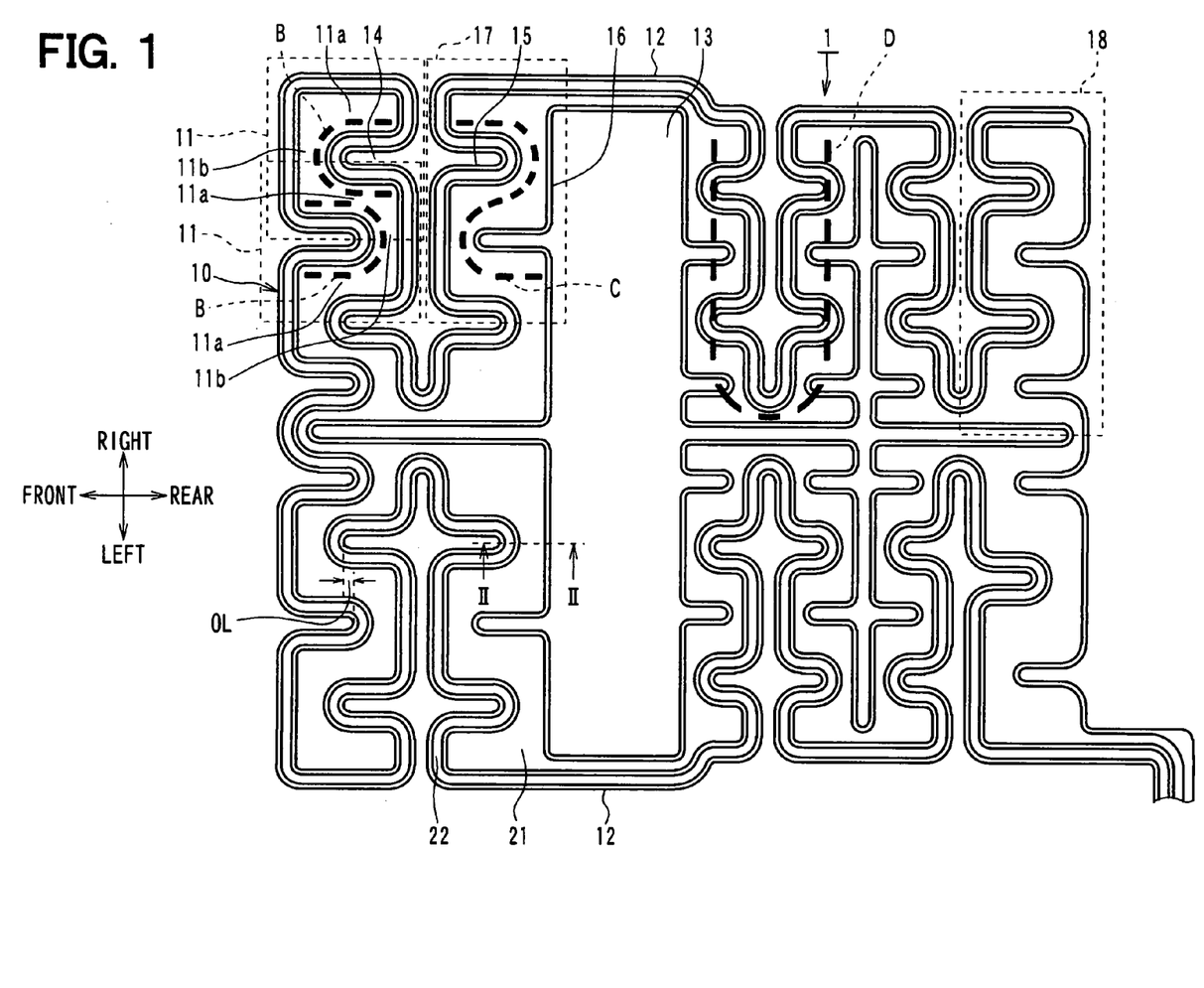
FIG. 1 is a plan view illustrating a sensor mat of a capacitive occupant sensor according to a first embodiment.

As shown in FIG. 1, the occupant sensor 1 includes a flat-shaped electrostatic sensor mat 10.

A plane pattern of the sensor mat 10 will be described with reference to FIG. 1. The sensor mat 10 corresponds to a rectangular seat, and has plural U-shaped U-parts 11. Further, the sensor mat 10 has a linear connecting portion 12 and a through hole portion 13. The liner connecting portion 12 is located on an outer periphery of the mat 10, and extends in a vehicle front-and-rear direction. The through hole portion 13 passes through the mat 10, and is surrounded by the plural U-parts 11. A longitudinal direction of the through hole portion 13 corresponds to a left-and-right direction approximately perpendicular to the front-and-rear direction.

The through hole portion 13 separates the mat 10 into a front area and a rear, area. The connecting portion 12 connects the front area and the rear area. A surface cover of the vehicle seat has a wire, and the wire passes through the through hole portion 13.

A left-and-right width of the front area of the mat 10 is larger than that of the rear area of the mat 10. A left-and-right width of a seat bottom of the vehicle seat is made larger as the seat bottom extends frontward. A shape of the mat 10 corresponds to the shape of the seat bottom.

The U-part 11 has an opening 14. The opening 14 is defined by a recessed part of the mat 10. A bold dashed line B of FIG. 1 represents a U-shape of the U-part 11. Two of the U-parts 11 are indicated by two bold dashed lines B located adjacent to each other. Other bold dashed lines B of the U-parts 11 are omitted in FIG. 1.

The U-parts 11 are arranged in the front-and-rear direction and in the left-and-right direction. The mat 10 has a combination of the opening 14 open in the front-and-rear direction and the opening 14 open in the left-and-right direction.

The U-part 11 has an extending portion 11*a* and a bent portion 11*b*. The extending portion 11*a* linearly extends, and the bent portion 11*b* is defined by bending a part of the extending portion 11*a*. That is, the U-part 11 is constructed by bending a part of a bar-shaped member. The U-part 11 may be defined by arranging the bent portion 11*b* between two of the extending portions 11*a*. At this time, the opening 14 is surrounded by the bent portion 11*b* and the extending portions 11*a*. The bent portion 11*b* corresponds to a curve of the U-part 11. The extending portion 11*a* corresponds to a linear part extending from the bent portion 11*b* toward an inlet of the opening 14.

A plane size of the U-part 11 is different between the front area and the rear area. The plane size represents a dimension of the U-part 11 in the front-and-rear direction, and a dimension of the U-part 11 in the left-and-right direction. The front-and-rear dimension and/or the left-and-right dimension of the U-part 11 located in the rear area is smaller than that located in the front area. The dimension of the U-part 11 may correspond to a dimension of the extending portion 11*a* or a dimension of the bent portion 11*b*.

As shown in FIG. 1, the U-part 11 has an inner circumference line 15 and an outer circumference line 16 located outside of the inner circumference line 15. The opening 14 is defined by the inner circumference line 15. An outer form of the U-part 11 is defined by the outer circumference line 16. That is, a dimension between the inner circumference line 15 and the outer circumference line 16 corresponds to a thickness of the U-part 11, a width of the extending portion 11*a*, or a width of the bent portion 11*b*.

As shown in FIG. 1, a S-shaped S-part 17 is defined by connecting the U-parts 11 located adjacent to each other, in a manner that the openings 14 of the U-parts 11 alternately open in directions opposite from each other. The mat 10 is defined by combining a plurality of the S-parts 17. Because the plane size of the U-part 11 is different between the front area and the rear area, a plane size of the S-part 17 located in the front area is larger than that located in the rear area.

When the S-part 17 is defined by two of the U-parts 11, the two of the U-parts 11 share the extending portion 11*a* with each other, because the U-part 11 is constructed by the extending portion 11*a* and the bent portion 11*b*.

The S-part 17 is represented by a bold dashed line C of FIG. 1 having a reverse S-shape. The reverse S-shape represents the S-shape of the S-part 17. Other bold dashed lines C of the S-parts 17 are omitted in FIG. 1.

As shown in FIG. 1, one of the U-parts 11 defining the S-part 17 has the opening 14 open frontward, and the other of the U-parts 11 defining the S-part 17 has the opening 14 open rearward. Further, the opening 14 open frontward and the opening 14 open rearward have an overlap part OL overlapping with each other in the left-and-right direction. Due to the overlap part OL, a part of the S-part 17 extending in the left-and-rear direction can be bent in the front-and-rear direction, and a linear portion of the S-part 17 extending in the left-and-right direction can be made short. That is, a plane pattern of the mat 10 has plural curves. Therefore, a linear portion of the mat 10 can be made short, such that occupant comfortableness can be raised.

As shown in a bold dashed line D of FIG. 1, the S-parts 17 are connected into another U-part larger than the U-part 11. The mat 10 may be defined by a plurality of the another U-parts represented by the line D. The S-parts of the another U-part extends parallel with each other in the left-and-right direction, and are connected with each other by connecting ends of the S-parts 17 in the left-and-right direction. Further, the another U-parts located adjacent to each other are connected with each other in the front-and-rear direction, in a manner that openings of the another U-parts are alternately open rightward or leftward.

When the another U-part is constructed by connecting the S-parts 17, the S-part 17 is deformable in the left-and-right direction, and the another U-part is deformable in the front-and-rear direction. That is, the mat 10 is deformable in both of the left-and-right direction and the front-and-rear direction approximately perpendicular to each other. Thus, the whole of the mat 10 has resiliency, and can be deformable and flexible.

The mat 10 has a meandering structure in both of the left-and-right direction and the front-and-rear direction by connecting the U-parts 11. The mat 10 has a block 18 meandering in the left-and-right direction, when the S-parts 17 are connected in the left-and-right direction. In the block 18, the openings 14 of the U-parts 11 are alternately open frontward or rearward. A plurality of the blocks 18 are, arranged in the front-and-rear direction, and are parallel with each other. Further, when two of the blocks 18 are located adjacent to each other in the front-and-rear direction, a right end or a left end of one of the blocks 18 is connected to a corresponding end of the other of the blocks 18. The connection of the ends of the blocks 18 is alternately performed by the right ends or the left ends in the front-and-rear direction. Thus, the mat 10 has a meandering structure meandering in the front-and-rear direction.

The block 18 located most left and rear position is connected to a connector (not shown). The position for outside connection is not limited to an example shown in FIG. 1. For example, the block 18 located most right and rear position may be connected to the connector. Alternatively, the block 18 located in an approximately center position in the left-and-rear direction may be connected to the connector.

Thus, the mat 10 has the meandering structure meandering in both of the front-and-rear direction and the left-and-rear direction by connecting the U-parts 11 or the S-parts 17. The S-part 17 has the openings 14 open in the front-and-rear direction, thereby the S-part 17 is deformable in the left-and-right direction. The blocks 18 connected with each other is deformable in the front-and-rear direction. Because the mat 10 is deformable in both of the front-and-rear direction and the left-and-right direction, flexibility of the mat 10 can be increased.

Figure 2:
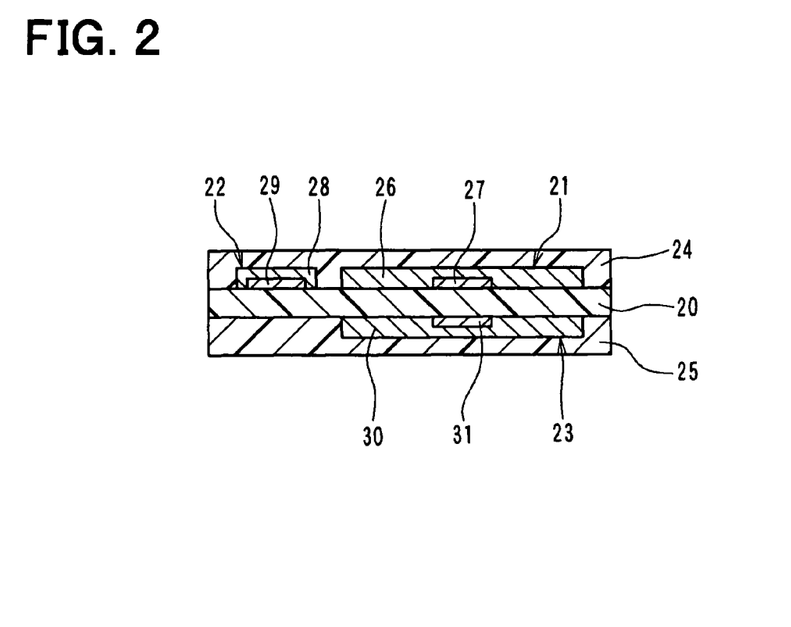
FIG. 2 is a cross-sectional view taken along line II-II of FIG. 1.

A cross-sectional structure of the mat 10 will be described with reference to FIG. 2. The mat 10 has a main film 20, a main electrode 21, a sub electrode 22, a guard electrode 23, a cover film 24 and a resist coat 25.

The film 20, 24 has a flat shape, and is made of electrical insulation material such as polyethylene terephthalate (PET). The films 20, 24 are bonded with each other through an adhesive (not shown). The resist coat 25 is formed on the main film 20 through a printing.

The main electrode 21 is used for determining whether an occupant is seated on the vehicle seat. The main electrode 21 has a carbon electrode 26 and a silver electrode 27. The main electrode 21 is arranged between the main film 20 and the cover film 24.

The carbon electrode 26 is a flat-shaped electrode, and the silver electrode 27 corresponds to a wiring. A width of the silver electrode 27 is smaller than that of the carbon electrode 26. The carbon electrode 26 is layered on the main film 20, and the silver electrode 27 is covered by the carbon electrode 26. The carbon electrode 26 is made of carbon, and a resistance of the carbon electrode 26 is larger than that of the silver electrode 27. A material cost of the carbon electrode 26 is lower than that of the silver electrode 27. The silver electrode 27 is made of silver, and has a width of 1 mm, for example. A dimension between an end of the main film 20 and an end of the carbon electrode 26 is 1.0-1.5 mm, for example.

The carbon electrode 26 of the main electrode 21 has a plane structure corresponding to that of the mat 10, such as the main film 20. That is, a shape of the main electrode 21 corresponds to a curve defined by the outer circumference line 16. Due to the curve, an area of the U-part 11 is increased, and an area of the main electrode 21 is increased.

The sub electrode 22 is used for determining whether the vehicle seat contains liquid. The sub electrode 22 has a carbon electrode 28 and a silver electrode 29. The sub electrode 22 is arranged between the main film 20 and the cover film 24.

A function of the carbon electrode 28 corresponds to that of the carbon electrode 26, and a function of the silver electrode 29 corresponds to that of the silver electrode 27. A width of the silver electrode 29 is smaller than that of the carbon electrode 28. The carbon electrode 28 is layered on the main film 20, and the silver electrode 29 is covered by the carbon electrode 28. The sub electrode 22 is located to be distanced from the main electrode 21. The main electrode 21 and the sub electrode 22 are located adjacent to each other. A dimension between an end of the main film 20 and an end of the carbon electrode 28 is 1.0-1.5 mm, for example.

The sub electrode 22 may be further used for determining whether an occupant is seated on the vehicle seat, together with the main electrode 21. If a child restraint system (CRS) is set on the vehicle seat, and if a child is seated on the CRS, the mat 10 is required to have more electrode area so as to distinguish the CRS from an adult seated on the vehicle seat. At this time, both of the main electrode 21 and the sub electrode 22 are used for determining whether an occupant is seated on the vehicle seat.

Figure 3:
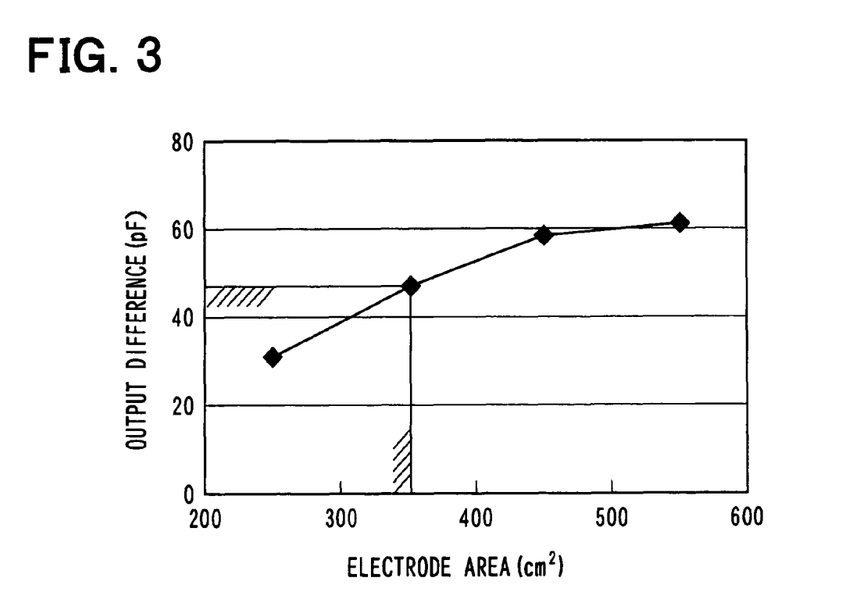
FIG. 3 is a graph illustrating a relationship between an output difference and an electrode area.

FIG. 3 is a graph illustrating a relationship between an output difference (pF) and an electrode area ($cm^2$). The output difference represents a difference between a capacitance output when a child and a CRS are arranged on the vehicle seat and a capacitance output when an adult is seated on the vehicle seat. The difference is necessary for distinguishing the CRS having the child from the adult. The electrode area represents an electrode area size of the mat 10.

As shown in FIG. 3, if the output difference has a value of 45 pF, an electrode area equal to or larger than 350 $cm^2$ is necessary for the distinguishing. In a case where a seat bottom of the vehicle seat has an area of 2300 $cm^2$, a ratio of the electrode area to the seat bottom area is necessary to be equal to or larger than 15%.

If the electrode area equal to or larger than 350 $cm^2$ is able to be achieved only by the main electrode 21, the distinguishing is performed by using only the main electrode 21. If the main electrode 21 has an area of 400 $cm^2$, and if the sub electrode 22 has an area of 150 $cm^2$, the distinguishing is performed by using only the main electrode 21. If the main electrode 21 is unable to meet the necessary area, the sub electrode 22 is used for the distinguishing so as to secure the necessary area.

For example, the main electrode 21 has an area of 300 $cm^2$, and the sub electrode 22 has an area of 140 $cm^2$. In this case, the main electrode 21 is unable to meet the necessary area. However, a sum of the areas of the main electrodes 21 and the sub electrode 22 is 440 $cm^2$, such that the necessary area can be met by the main electrodes 21 and the sub electrode 22. Thus, the sub electrode 22 is used for the distinguishing.

When the guard electrode 23 is made to have the same electric potential as the main electrode 21, a capacitance between a heater arranged in the vehicle seat and the main electrode 21 is cancelled, and a capacitance between a frame arranged in the vehicle seat and the main electrode 21 is cancelled. The guard electrode 23 has a carbon electrode 30 and a silver electrode 31.

A function of the carbon electrode 30 of the guard electrode 23 corresponds to that of the carbon electrode 26, 28, and a function of the silver electrode 31 of the guard electrode 23 corresponds to that of the silver electrode 27, 29. The guard electrode 23 is arranged between the main film 20 and the resist coat 25, and opposes to the main electrode 21. The main electrode 21 and the guard electrode 23 are separated and insulated from each other by the main film 20.

An extending shape of the silver electrode 27 of the main electrode 21 will be described with reference to FIGS. 4, 5, 6A, 6B and 6C.

Figure 4:
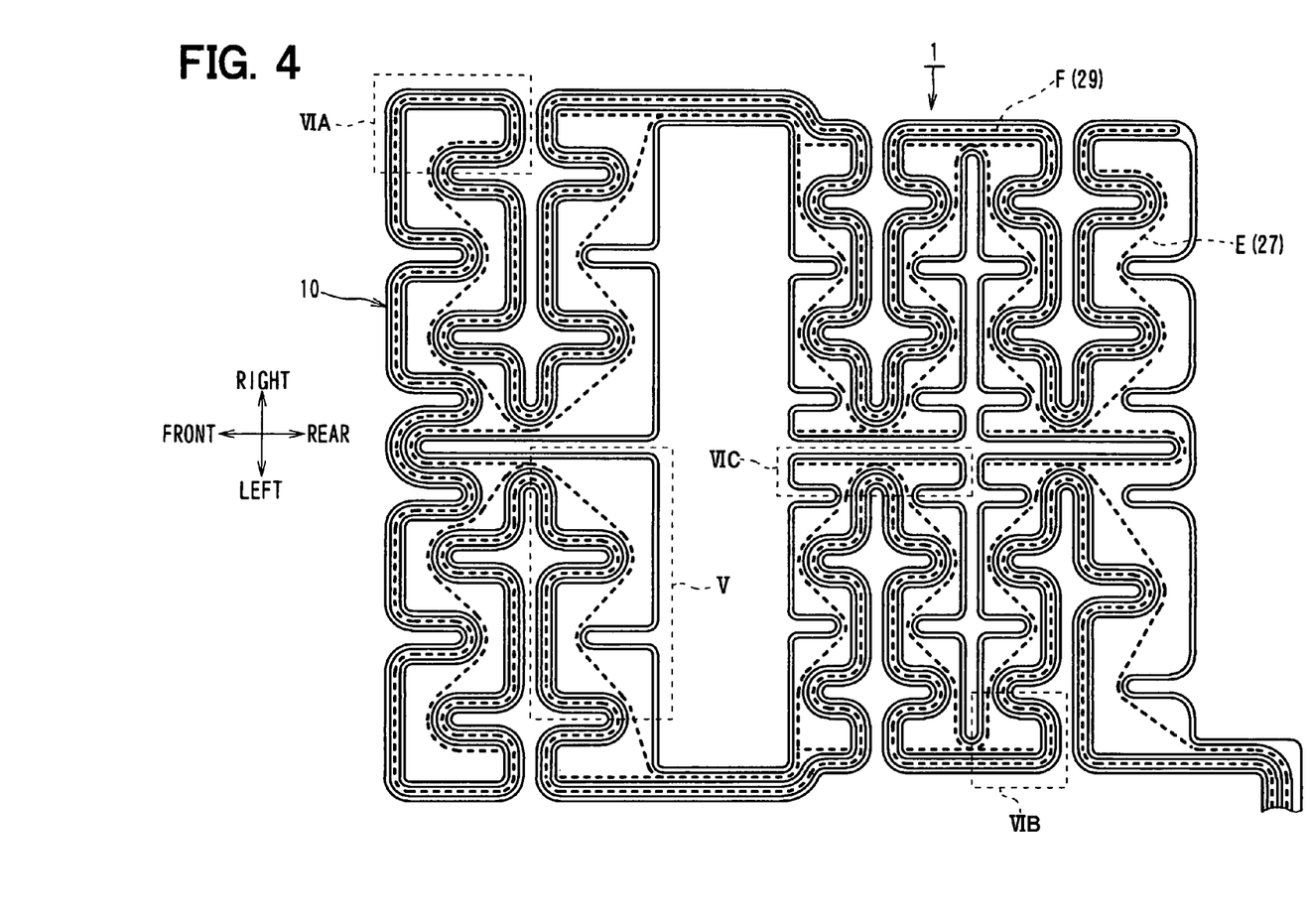
FIG. 4 is a plan view illustrating a silver electrode of a main electrode and a silver electrode of a liquid detection electrode of the sensor mat.

A dashed line E of FIG. 4 represents the extending shape of the silver electrode 27 of the main electrode 21 of FIG. 1. A dashed line F of FIG. 4 represents an extending shape of the silver electrode 29 of the sub electrode 22 of FIG. 1.

The width of the main electrode 21 is larger than that of the sub electrode 22. If the silver electrode 27 of the main electrode 21 has a plane pattern corresponding to a shape of the U-part 11, an amount of silver used for the silver electrode 27 becomes large. In this case, material cost of the main electrode 21 becomes high.

As shown in the dashed line E of FIG. 4, the silver electrode 27 of the main electrode 21 has a patterning in a manner that inner sides of the bent portions 11b are connected. The inner side of the bent portion 11b is defined by a part of the bent portion 11b close to the opening 14.

At this time, a route length of the silver electrode 27 can be made short, compared with a comparison case in which a silver electrode of a main electrode has a patterning located at a midpoint of the main electrode in a width direction. Thus, the amount of silver used for forming the silver electrode 27 can be reduced.

Figure 5:
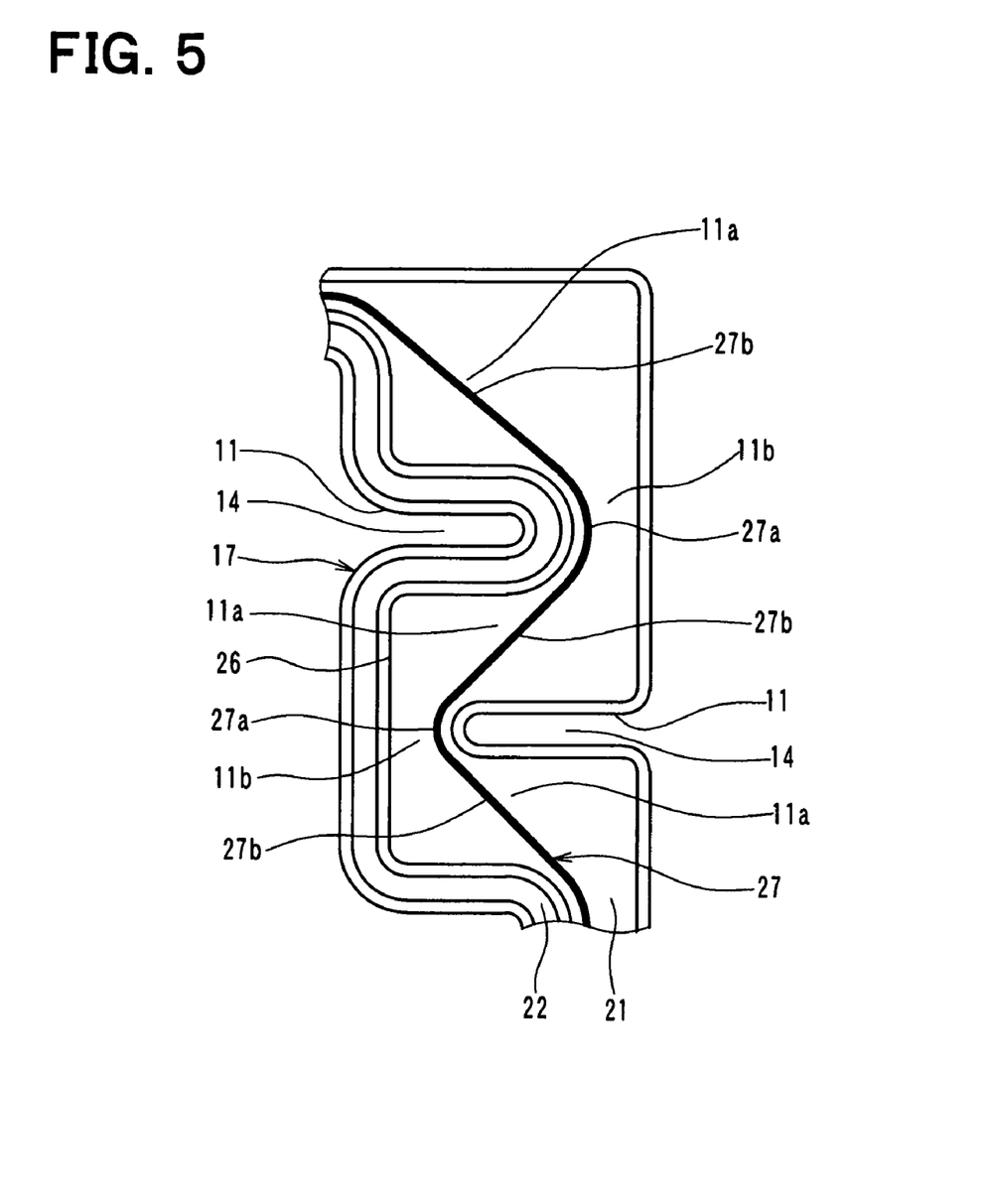
FIG. 5 is an enlarged view of a section V of FIG. 4.

FIG. 5 is an enlarged view of a section V of FIG. 4. As shown in FIG. 5, the silver electrode 27, has an arc part 27a and a linear part 27b. The silver electrode 29 of the sub electrode 22 is omitted in FIG. 5.

The arc part 27a has a patterning corresponding to a shape of the bent portion 11b, and is located adjacent to the opening 14. That is, the patterning of the arc part 27a extends to correspond to the inner circumference line 15 of the bent portion 11b. In the bent portion 11b of the U-part 11, a dimension between the carbon electrode 26 and the arc part 27a of the silver electrode 27 is 1.0-1.5 mm, for example.

A curve length of the arc part 27a is smaller than that of a semicircle. As shown in FIG. 5, a curvature and a length of the arc part 27a are different between a case in which the sub electrode 22 is located adjacent to the opening 14 and a case in which the sub electrode 22 is located on a side opposite from the opening 14.

The linear part 27b has a pattern linearly extending to connect the arc parts 27a of the bent portions 11b located adjacent to each other. That is, the linear part 27b extends to cross to an extending direction of the extending portion 11a. In other words, the linear part 27b extends to slantwise cross the extending portion 11a of the U-part 11.

The linear part 27b is connected to an arc drawn to correspond to the inner circumference line 15 defining the bent portion 11b. That is, as for a connection part defined between the arc part 27a and the linear part 27b, a tangent of the arc corresponds to the linear part 27b.

The silver electrode 27 is constructed by the arc part 27a and the linear, part 27b, and the extending shape of the silver electrode 27 is defined by connecting the arc part 27a and the linear part 27b. Therefore, the inner sides of the bent portions 11b are connected with each other at the shortest distance. Thus, the amount of silver used for the silver electrode 27 can be reduced.

The above description is performed relative to the plane pattern of the silver electrode 27 of the S-part 17. At least a part of the silver electrode 27 is patterned on the extending portion 11a of the U-part 11. Therefore, a voltage can be uniformly applied to the main electrode 21 of the mat 10. The uniform voltage applying will be described with reference to FIGS. 6A, 6B and 6C.

Figure 6A:
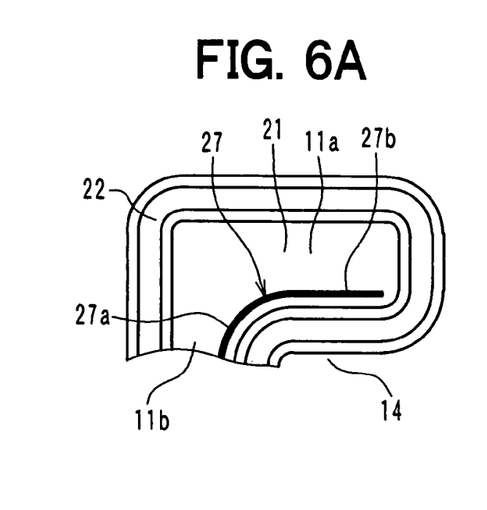
FIG. 6A is an enlarged view of a section VIA of FIG. 4.
Figure 6B:
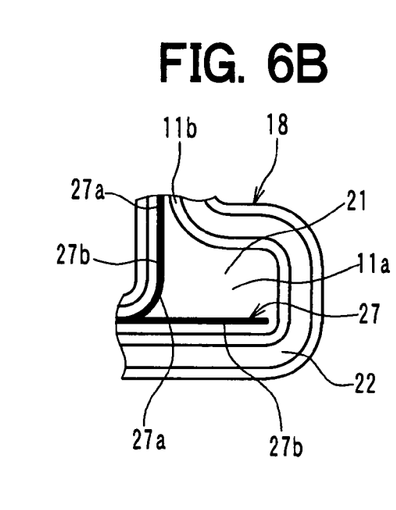
FIG. 6B is an enlarged view of a section VIB of FIG. 4.
Figure 6C:
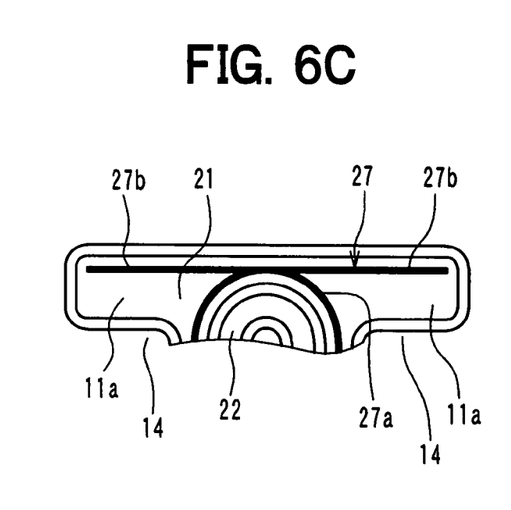
FIG. 6C is an enlarged view of a section VIC of FIG. 4.

FIG. 6A is an enlarged view of a section VIA of FIG. 4. FIG. 6B is an enlarged view of a section VIB of FIG. 4. FIG. 6C is an enlarged view of a section VIC of FIG. 4. The silver electrode 29 of the sub electrode 22 is omitted in FIGS. 6A, 6B and 6C.

The section VIA of FIG. 4 is a termination point of the S-part 17. As shown in FIG. 6A, in the extending portion 11a of the termination point, the linear part 27b connected to the arc part 27a is patterned close to the opening 14 of the U-part 11. That is, the linear part 27b extends to correspond to the inner circumference line 15 of the U-part 11.

The section VIB of FIG. 4 is a connection connecting the blocks 18, and the connection is located on an outer periphery of the mat 10. As shown in FIG. 6B, in the connection, the sub electrode 22 is located on an outer side of the main electrode 21.

The arc part 27a is patterned at the connection, and two of the linear parts 27b are connected to the arc part 27a. One of the linear parts 27b is patterned to extend along the extending portion 11a, and is located on a side opposite from the opening 14 of the U-part 11. This linear part 27b extends to correspond to the sub electrode 22. The other of the linear parts 27b is connected to other arc part 27a formed on the bent portion 11b of the U-part 11 of the block 18.

The section VIC of FIG. 4 is a connection connecting the blocks 18, and the connection is located on an inner side of the mat 10. Similarly to the section VIB, the arc part 27a is patterned at the connection, and two of the linear parts 27b are connected to the arc part 27a. The two linear parts 27b are patterned to extend along the extending portion 11a, and are located on a side opposite from the opening 14. Thus, at least a part of the silver electrode 27 is patterned on the extending portion 11a of the U-part 11 connecting the blocks 18.

The above description is performed for the shortest route length of the silver electrode 27 of the main electrode 21. Similarly, the sub electrode 22 is defined to have a shortest route length. The sub electrode 22 has a patterning extending along the inner circumference line 15 or the outer circumference line 16 of the U-part 11. Therefore, the route length of the silver electrode 29 of the sub electrode 22 can be made the shortest.

A method of producing the mat 10 will be described. The main film 20 is prepared, and the silver electrode 27 of the main electrode 21 and the silver electrode 29 of the sub electrode 22 are printed on a first face of the main film 20. The silver electrode 31.of the guard electrode 23 is printed on a second face of the main film 20. The silver electrode 31 has a position corresponding to that of the silver electrode 27 of the main electrode 21 through the main film 20.

The carbon electrode 26, 28 is printed on the silver electrode 27, 29 and the first face of the main film 20. The carbon electrode 30 is printed on the silver electrode 31 of the guard electrode 23 and the second face of the main film 20. The carbon electrode 30 has a position corresponding to that of the carbon electrode 26 of the main electrode 21 through the main film 20.

The resist coat 25 is printed on the carbon electrode 30 of the guard electrode 23.

The cover film 24 is bonded to the first face of the main film 20 so as to cover the main electrode 21 and the sub electrode 22.

The silver electrode 27, 29, 31, the carbon electrode 26, 28, 30, and the resist coat 25 may be formed by other method without the printing.

The electrode 21, 22, 23 is connected to a connector (not shown), and is electrically connected to other electric circuit (not shown) through the connector. The sensor 1 has an electric circuit (not shown) to supply an alternate power for the electrode 21, 22, 23 of the mat 10. The sensor 1 can perform occupant determination and liquid determination by using the electric circuit.

Specifically, an alternate voltage is applied to the main electrode 21, and an electric field is generated between the main electrode 21 and a vehicle chassis. Further, an alternate voltage is applied to the guard electrode 23, such that the main electrode 21 and the guard electrode 23 have the same electric potential. Similarly to the main electrode 21, an alternate voltage is applied to the sub electrode 22.

When the vehicle seat is vacant, air is mainly located between the electrode 21, 22 and the vehicle chassis. When an occupant is seated on the vehicle seat, a human body of the occupant is located between the electrode 21, 22 and the vehicle chassis. At this time, a capacitance between the electrode 21, 22 and the vehicle chassis is varied compared with a case in which the vehicle seat is vacant. Whether an occupant is seated or not can be detected by detecting the capacitance variation.

The guard electrode 23 forms an electric field with a seat heater and a seat frame of the vehicle seat. The guard electrode 23 is located between the main electrode 21 and the seat heater, and is located between the main electrode 21 and the seat frame, so as to have the same potential as the main electrode 21. Therefore, a capacitance between the main electrode 21 and the seat heater, and a capacitance between the main electrode 21 and the seat frame are cancelled. Thus, influence of the seat heater or the seat frame can be reduced relative to the main electrode 21.

An electric field is generated between the main electrode 21 and the sub electrode 22. When liquid such as pure water or saline solution is located between the main electrode 21 and the sub electrode 22, capacitance and resistance between the electrodes 21, 22 are varied. Whether the vehicle seat contains liquid or not can be detected by detecting the variations.

According to the first embodiment, the plane pattern of the silver electrode 27 of the main electrode 21 is constructed by the arc part 27a and the linear part 27b. The linear part 27a and the arc part 27b are patterned on the extending portion 11a and the bent portion 11b of the U-part 11 in a manner that the inner sides of the bent portions 11b are connected with each other.

Therefore, the route length of the silver electrode 27 can be short compared with a case in which a silver electrode extends at a center part of a S-part in a width direction. Thus, the amount of silver used for the silver electrode 27 can be reduced. The inner sides of the bent portions 11b are connected at the shortest distance, because the route of the silver electrode 27 is formed by the plane patterns of the linear part 27a and the arc part 27b. Therefore, the amount of silver used for the silver electrode 27 can be reduced. Accordingly, a producing cost of the mat 10 can be reduced.

As shown in FIG. 1, the openings 14 of the U-parts 11 of the S-part 17 have the overlap part OL in the left-and-right direction. Therefore; a route length of the S-part 17 may become longer compared with a case in which an overlap part is not defined. However, the route length of the silver electrode 27 can be made the shortest in the S-part 17, even if the route length of the S-part 17 is made longer due to the overlap part OL, because the silver electrode 27 is patterned adjacent to the opening 14. Thus, the amount of silver used for the silver electrode 27 can be reduced.

The vehicle front-and-rear direction may correspond to a first direction, and the vehicle left-and-right direction may correspond to a second direction. The front area may correspond to an area located on a first side of the first direction, and the rear area may correspond to an area located on a second side of the first direction. The main film 20 may correspond to a base member. The silver electrode 27 of the main electrode 21 may correspond to a first electrode, and the carbon, electrode 26 of the main electrode 21 may correspond to a second electrode.

Second Embodiment

Points of a second embodiment different from the first embodiment will be described. In the first embodiment, the silver electrode 27 of the main electrode 21 is constructed by the arc part 27a and the linear part 27b. In the second embodiment, a silver electrode 27 is constructed by only linear parts 27b.

Figure 7:
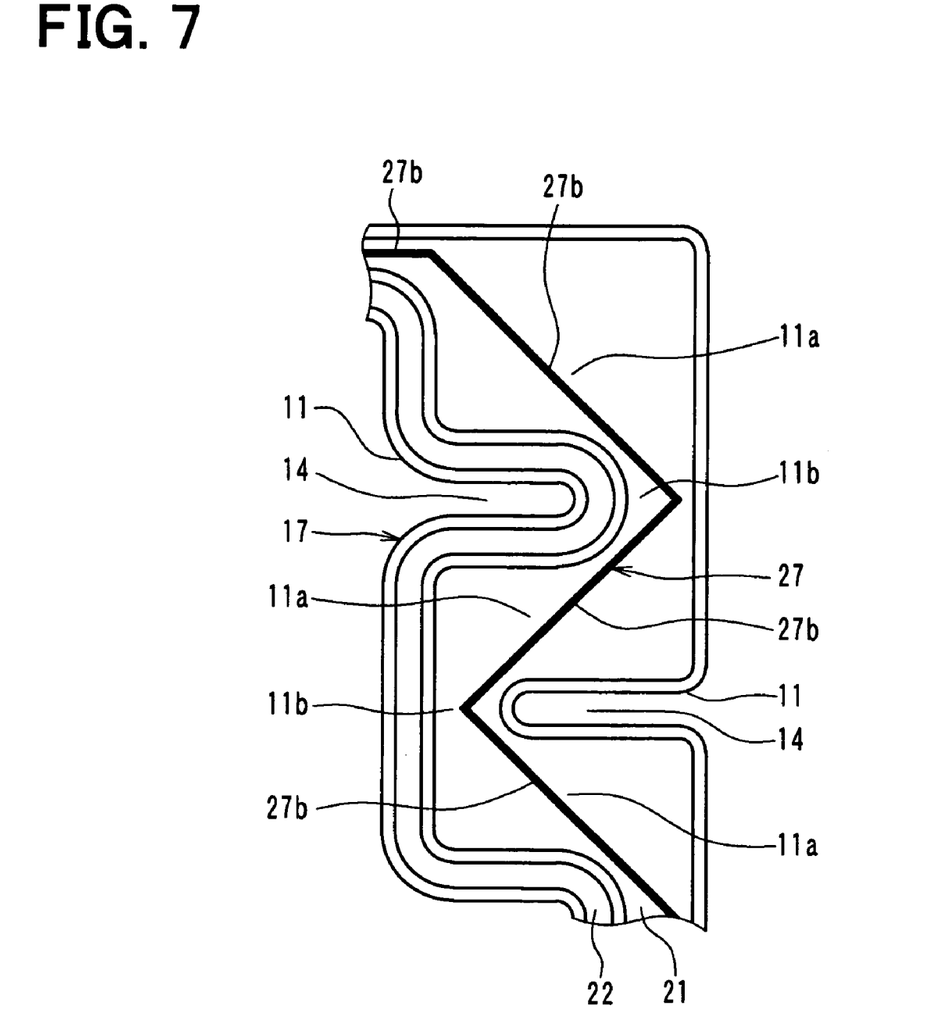
FIG. 7 is an enlarged plan view illustrating a silver electrode of a main electrode of a sensor mat of a capacitive occupant sensor according to a second embodiment.

FIG. 7 is an enlarged plan view corresponding to the section V of FIG. 4. As shown in FIG. 7, the silver electrode 27 is constructed by the linear parts 27b. In the S-part 17, the linear part 27b connects the inner sides of the bent portions 11b opposing to the opening 14. Further, the linear part 27b has a patterning to cross the extending direction of the extending portion 11a. Therefore, the extending dimension of the silver electrode 27 of the S-part 17 can be made the shortest. Thus, the amount of silver used for the silver electrode 27 can be reduced.

As for the sections VIA, VIB and VIC of FIG. 4, the plane pattern of the silver electrode 27 may be constructed by only the linear part 27b. Alternatively, the plane pattern of the silver electrode 27 may be constructed by only the arc part 27a. As for the sections VIB and VIC indicating the connection connecting the blocks 18, the silver electrode 27 may be constructed by the arc part 27a, in a manner that the route length of the silver electrode 27 is made short.

Third Embodiment

Points of a third embodiment different from the first and second embodiments will be described. In the third embodiment, a silver electrode 27 of a main electrode 21 is constructed by only arc parts 27a.

Figure 8:
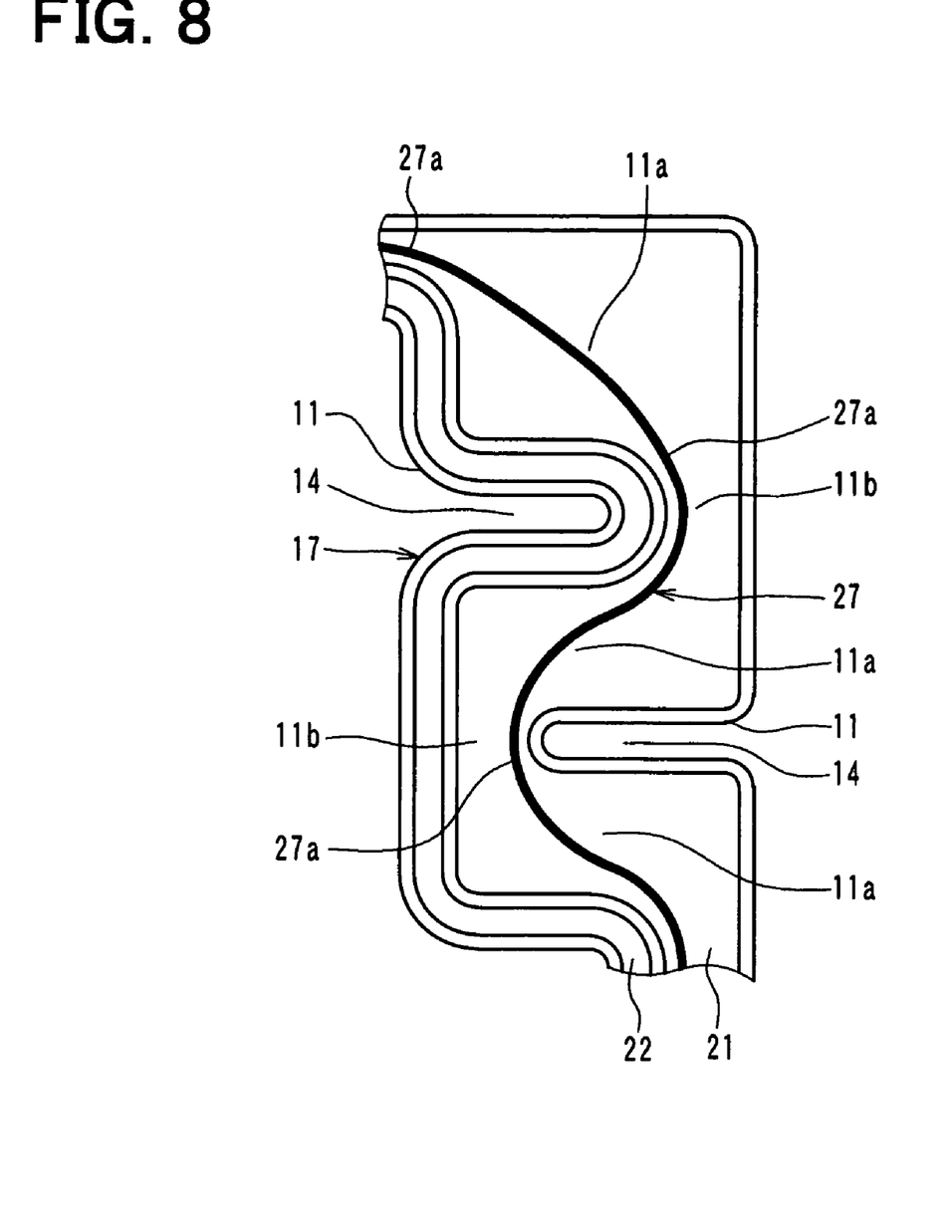
FIG. 8 is an enlarged plan view illustrating a silver electrode of a main electrode of a sensor mat of a capacitive occupant sensor according to a third embodiment.

FIG. 8 is an enlarged plan view corresponding to the section V of FIG. 4. As shown in FIG. 8, the silver electrode 27 is constructed by the arc parts 27a. In the S-part 17, one of the arc parts 27a has a patterning corresponding to a shape of the bent portion 11b.

The other of the arc parts 27a is connected to the one of the arc parts 27a, and has a patterning corresponding to a shape of the bent portion 11b.

The patterning of the arc part 27a is not parallel with the inner circumference line 15 defining the bent portion 11b. The patterning of the arc part 27a is defined in accordance with a curved shape of the bent portion 11b. Specifically, a protrusion direction of the arc part 27a is the same as a protrusion direction of the inner circumference line 15. If the protrusion directions are opposite from each other, the route length of the silver electrode 27 cannot be made short.

According to the third embodiment, the inner sides of the bent portions 11b of the U-parts 11 are connected by the arc part 27a. Therefore, the extending dimension of the silver electrode 27 can be made the shortest. Thus, the amount of silver used for the silver electrode 27 can be reduced.

As for the sections VIA, VIB and VIC of FIG. 4, the silver electrode 27 may be constructed by only the arc part 27a. Alternatively, the silver electrode 27 may have the linear part 27b. As for the sections VIB and VIC indicating the connection connecting the blocks 18, the linear part 27b of the silver electrode 27 may be changed into the arc part 27a.

Other Embodiment

The carbon electrode 26 of the main electrode 21 may be made of other material different from carbon. The silver electrode 27 of the main electrode 21 may be made of other material different from silver, such as copper. Similarly, the sub electrode 22 and the guard electrode 23 may be made of other materials.

Figure 9A:
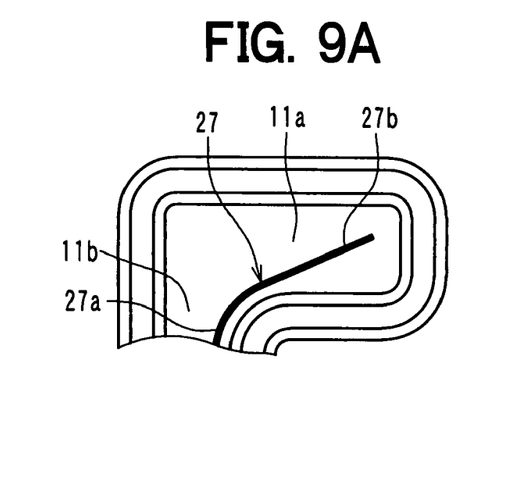
FIG. 9A is an enlarged plan view corresponding to the section VIA of FIG. 4.
Figure 9B:
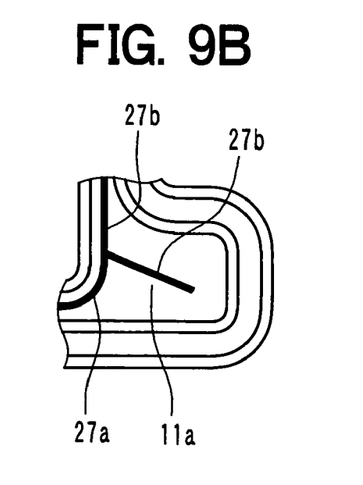
FIG. 9B is an enlarged plan view corresponding to the section VIB of FIG. 4.
Figure 9C:
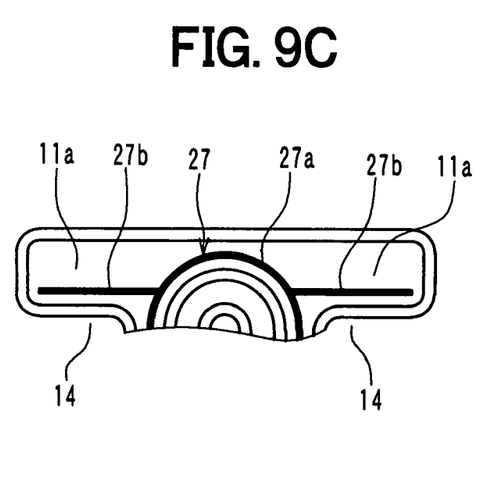
FIG. 9C is an enlarged plan view corresponding to the section VIC of FIG. 4.

The patterning of the silver electrode 27 is not limited to the examples of FIGS. 6A, 6B and 6C. The section VIA of FIG. 4 may have a patterning shown in FIG. 9A. The linear part 27b connected to the arc part 27a extends to cross the extending direction of the extending portion 11a. The section VIB of FIG. 4 may have a patterning shown in FIG. 9B. Another linear part 27b is connected to the linear part 27b. The section VIC of FIG. 4 may have a patterning, shown in FIG. 9C. The linear part 27b of FIG. 9C is located adjacent to the opening 14 than the linear part 27b of FIG. 6C. The patterning of the silver electrode 27 is not limited to the examples of FIGS. 9A, 9B and 9C.

The plane structure of the mat 10 is not limited to the above example. For example, as shown in FIGS. 10, 11 and 12, the mat 10 may have a plane structure different from FIG. 1.

Figure 10:
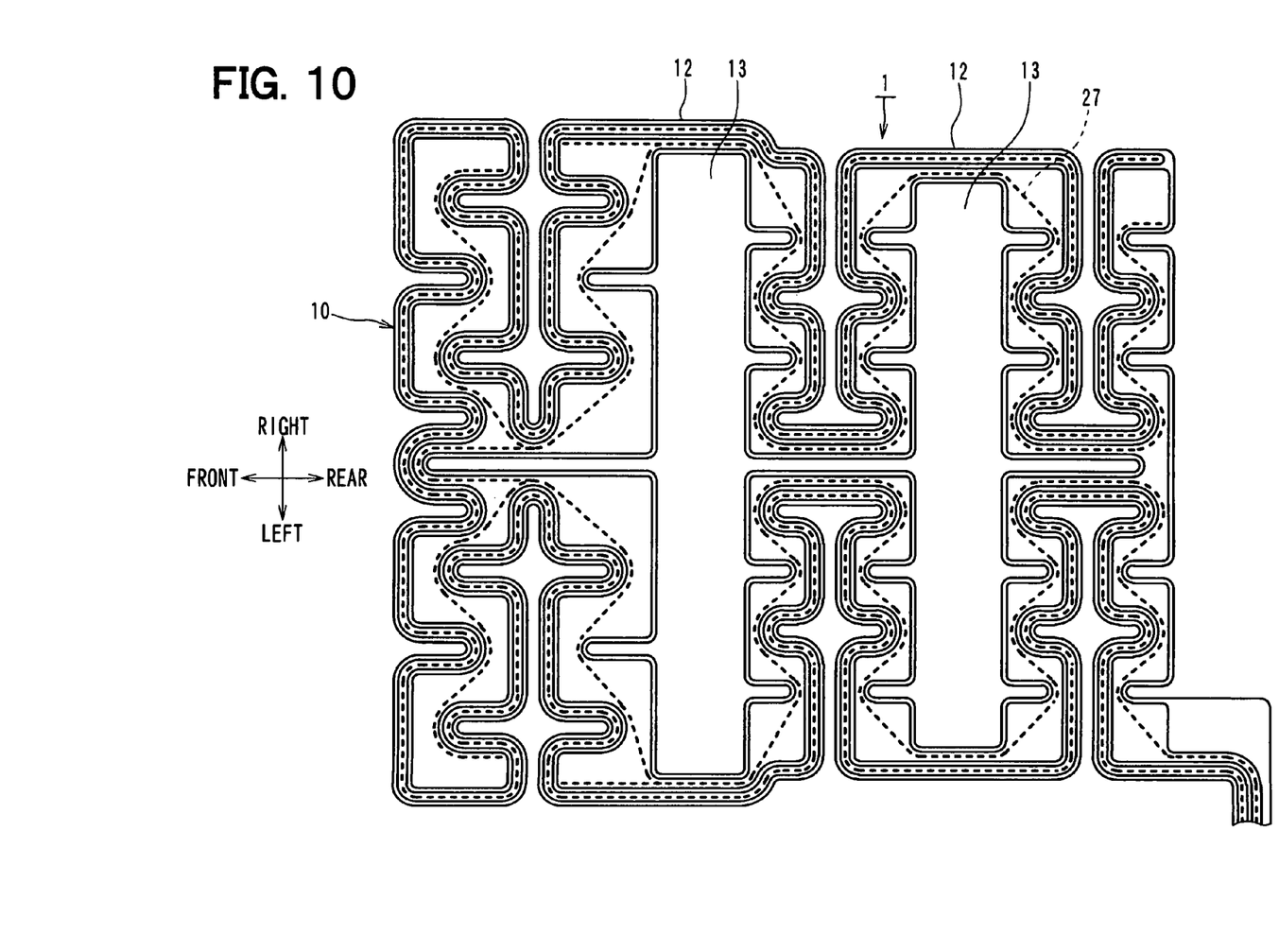
FIG. 10 is a plan view illustrating a plane structure of a sensor mat of a capacitive occupant sensor according to other embodiment.

As shown in FIG. 10, the electrostatic sensor mat 10 has a plurality of the through hole portions 13 passing through the electrostatic sensor mat 10. Specifically, two of the through hole portions 13 are defined in the electrostatic sensor mat 10 of FIG. 10.

The through hole portion 13 is surrounded by the connecting portion 12 extending on the periphery of the mat 10 in the front-and-rear direction, and the U-parts 11 arranged in the left-and-right direction. The through hole portion 13 extends in the left-and-right direction, and two of the through hole portions 13 are arranged in the front-and-rear direction. The number of the through hole portions 13 is not limited to two. The mat 10 may have three or more through hole portions 13.

Figure 11:
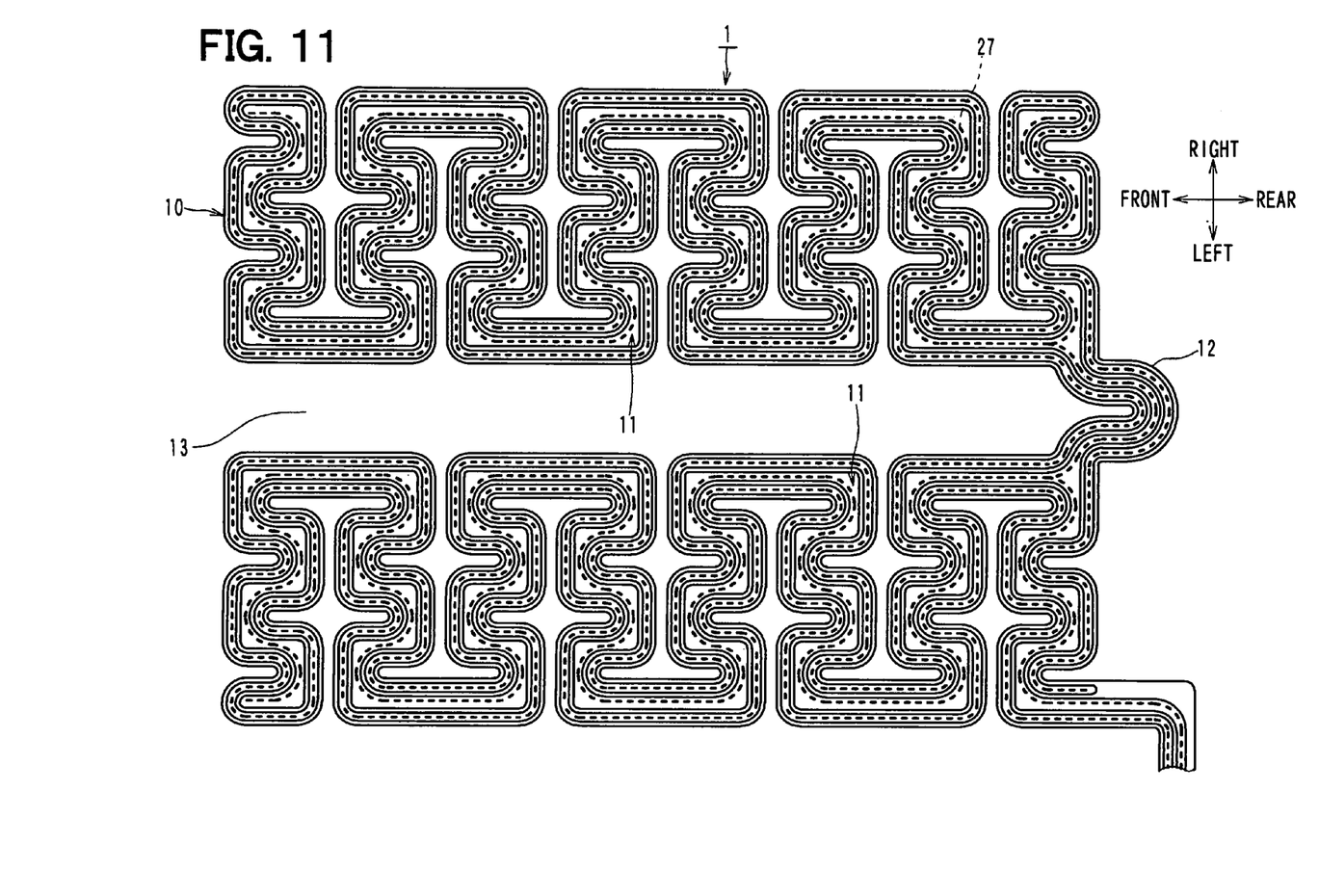
FIG. 11 is a plan view illustrating a plane structure of a sensor mat of a capacitive occupant sensor according to other embodiment.
Figure 12:
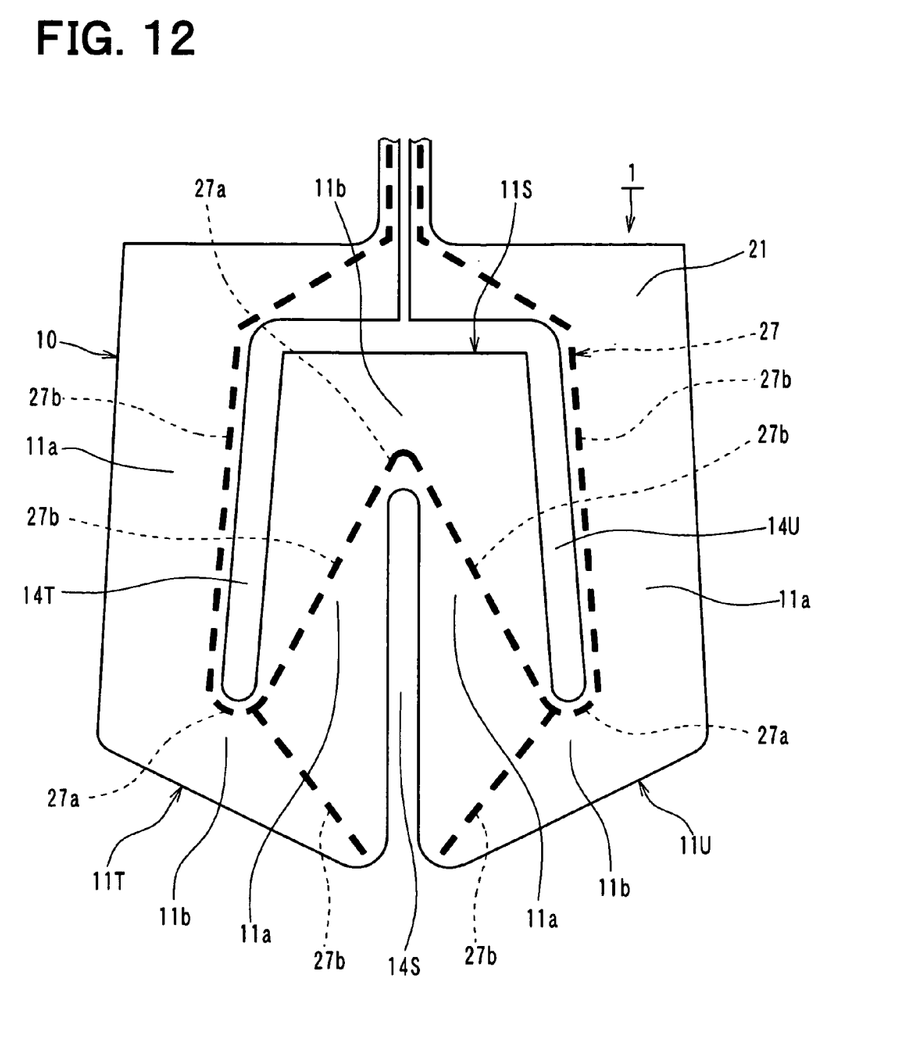
FIG. 12 is a plan view illustrating a plane structure of a sensor mat of a capacitive occupant sensor according to other embodiment.

As shown in FIG. 11, the mat 10 has a through hole portion 13 extending in the front-and-rear direction, which is different from FIGS. 1 and 10. The through hole portion 13 is surrounded by a connecting portion 12 and the U-parts 11 arranged in the front-and-rear direction. The connecting portion 12 is located on an outer periphery of the mat 10, and extends in the left-and-right direction. The connecting portion 12 is located at most rear side of the mat 10, and connects a right area of the mat 10 and a left area of the mat 10. In other words, the through hole portion 13 of FIG. 11 separates the electrostatic sensor mat 10 into two parts in the left-and-right direction.

The through hole portion 13 opens frontward. Alternatively, the through hole portion 13 may be closed by the U-parts 11 arranged in the front-and-rear direction and the connecting portions 12 arranged on both of the front side and the rear side. Further, the mat 10 may have two or more through hole portions 13 extending in the front-and-rear direction.

As shown in FIG. 12, the mat 10 has a plane pattern defined by connecting three U-parts 11S, 11T, 11U in a manner that openings 14S, 14T, 14U of the U-parts 11S, 11T, 11U alternately open in directions opposite from each other. In this case, a S-part is defined by the three U-parts 11S, 11T, 11U located adjacent to each other. Only a main electrode 21 is formed on a main film 20 of the mat 10 of FIG. 12.

The U-part 11S is located between the U-parts 11T, 11U. When the silver electrode 27 is arranged on the bent portion 11b of the U-part 11S, the arc part 27a of the silver electrode 27 is located to be adjacent to the opening 14S. The linear part 27b is located on the extending portion 11a of the U-part 11S so as to extend to cross the extending direction of the extending portion 11a. The arc part 27a is patterned on the bent portion 11b of the U-part 11T, 11U. The linear part 27b of the U-part 11S is connected to the arc part 27a of the U-part 11T, 11U. A linear part 27b is patterned on the extending portion 11a of the U-part 11T, 11U. The linear part 27 extends in the extending direction of the extending portion 11a, and is located adjacent to the opening 14T, 14U. Further, another linear part 27b extends from the arc part 27a of the U-part 11T, 11U toward an inlet of the opening 14S. Thus, the route length of the silver electrode 27 can be made the shortest, such that the amount of silver used for the silver electrode 27 can be reduced. Thus, a voltage can be uniformly applied to the whole of the main electrode 21.

The number of the S-parts 17 and a connection state of the S-parts or the U-parts are not limited to the examples of FIGS. 10, 11 and 12. The patterning of the silver electrode 27 is not limited to the examples of FIGS. 10, 11 and 12. Other patterning enabling the route length to be shorter may be used for the silver electrode 27.

The shape of the opening 14 of the U-part 11 is not limited to the examples of FIGS. 1, 10, 11 and 12. The size of the U-part 11 and the size of the S-part 17 are not limited to the above description.

The linear part 27b is not limited to be constructed by a single straight line. The linear part 27b may be made of plural straight lines having angles relative to each other. Similarly, the arc part 27a may be made of a single arc or plural arcs connected with each other.

Such changes and modifications are to be understood as being within the scope of the present invention as defined by the appended claims.

What is claimed is:

1. A capacitive occupant sensor to detect an occupant seated on a vehicle seat comprising:
    an electrostatic sensor mat arranged inside of the vehicle seat, the mat including
        a base member, and
        a main electrode arranged on the base member so as to detect the occupant based on a capacitance variation of the mat, wherein
    the main electrode has
        a first electrode disposed on the base member, and
        a second electrode covering the first electrode, the second electrode being less expensive than the first electrode,
    the base member includes a plurality of U-shaped U-parts, each of the U-parts having
        two extending portions approximately linearly extending in a first direction,
        a bent portion which is defined by bending a part of the extending portions, and
        an opening which is defined by a part of the base member recessed in the first direction and surrounded by the extending portions and the bent portion,
    the U-parts located adjacent to each other are connected with each other so as to define an S-shaped S-part, in a manner that the openings alternately open toward a first side of the first direction or a second side of the first direction,
    the base member is constructed by a plurality of the S-parts, and
    the first electrode is located adjacent to the opening when the first electrode is patterned on the bent portion.

2. The capacitive occupant sensor according to claim 1, wherein
    the first electrode is patterned in the extending portions so as to extend to cross an extending direction of the extending portions.

3. The capacitive occupant sensor according to claim 1, wherein
    the first electrode has an arc part and a linear part,
    the arc part has a shape corresponding to a shape of the bent portion, and is patterned on an inner side of the bent portion of the U-parts defining the S-part, and
    the linear part extends to connect the arc part patterned on the bent portion of one of the U-parts defining the S-part to the arc part patterned on the bent portion of the other of the U-parts defining the S-part.

4. The capacitive occupant sensor according to claim 1, wherein
    the first electrode has a linear part, and
    the linear part extends to connect inner sides of the bent portions of the U-parts defining the S-part.

5. The capacitive occupant sensor according to claim 1, wherein
    the first electrode has a plurality of arc parts,
    one of the plurality of arc parts has a shape corresponding to that of the bent portion, and is patterned on an inner side of the bent portion of one of the U-parts defining the S-part,
    the other of the plurality of arc parts is connected to the one of the plurality of arc parts, and the other of the plurality of arc parts has a shape corresponding to that of the bent portion, and is patterned on an inner side of the bent portion of the other of the U-parts defining the S-part.

6. The capacitive occupant sensor according to claim 1, wherein at least a part of the first electrode is patterned on the extending portions of the U-part.

7. The capacitive occupant sensor according to claim 1, wherein the U-parts are arranged in the first direction and a second direction approximately perpendicular to the first direction in the mat, the opening of one of the U-parts defining the S-part faces to the first side of the first direction, and the opening of the other of the U-parts faces to the second side of the first direction, and the opening open toward the first side of the first direction and the opening open toward the second side of the first direction have an overlap part overlapping with each other in the second direction.

8. The capacitive occupant sensor according to claim 1, wherein the U-parts are arranged in the first direction and a second direction approximately perpendicular to the first direction in the mat, and the mat has a connecting portion located on an outer periphery of the mat, the connecting portion extending in the first direction, and a through hole portion surrounded by the connecting portion and the U-parts arranged in the second direction, the through hole portion passing through the mat.

9. The capacitive occupant sensor according to claim 1, wherein the U-parts are arranged in the first direction and a second direction approximately perpendicular to the first direction in the mat, the mat has a connecting portion located on an outer periphery of the mat, the connecting portion extending in the first direction, and a plurality of through hole portions, the through hole portion being surrounded by the connecting portion and the U-parts arranged in the second direction, the through hole portion passing through the mat, and the plurality of through hole portions is arranged in the first direction.

10. The capacitive occupant sensor according to claim 1, wherein the U-parts are arranged in the first direction and a second direction approximately perpendicular to the first direction in the mat, and the mat has a connecting portion located on an outer periphery of the mat, the connecting portion extending in the second direction, and a through hole portion surrounded by the connecting portion and the U-parts arranged in the first direction, the through hole portion passing through the mat.

* * * * *